O. SCHALLER.
STOP COCK OR VALVE FOR VACUUM PIPE SYSTEMS.
APPLICATION FILED MAY 12, 1910.

1,003,068.       Patented Sept. 12, 1911.

Witnesses:
W. H. Berrigan
Alfred R. Anderson

Inventor:
OTTO SCHALLER
by F. van Dedeunal
Attorney.

UNITED STATES PATENT OFFICE.

OTTO SCHALLER, OF SÜDENDE, NEAR BERLIN, GERMANY.

STOP-COCK OR VALVE FOR VACUUM PIPE SYSTEMS.

1,003,068.   Specification of Letters Patent.   Patented Sept. 12, 1911.

Application filed May 12, 1910. Serial No. 560,966.

*To all whom it may concern:*

Be it known that I, OTTO SCHALLER, a subject of the Emperor of Germany, and residing at Südende, near Berlin, German Empire, have invented a new and useful Improved Stop-Cock or Valve for Vacuum Pipe Systems, of which the following is a description.

In connection with vacuum pipe conduits for very high vacuum it is of great importance and at the same time very difficult to attain an absolutely tight stop cock or valve for the same.

The object of the present invention is to provide a stop cock or valve for this class of pipe system, which shall be absolutely tight for all practical purposes. This object is attained by inclosing the stop cock or valve of the high vacuum system within a vacuum chamber, which, as far as possible, is constantly exhausted, either by means of a vacuum pump or other device, having vacuum conduits separate from those of the high vacuum pipe system. In the manufacture of incandescent lamps, a separate vacuum pipe system of this kind is always at hand, the high vacuum pump being employed in combination with a vacuum pump of lower vacuum capacity, in order to facilitate the production of the high vacuum.

Figure 1:
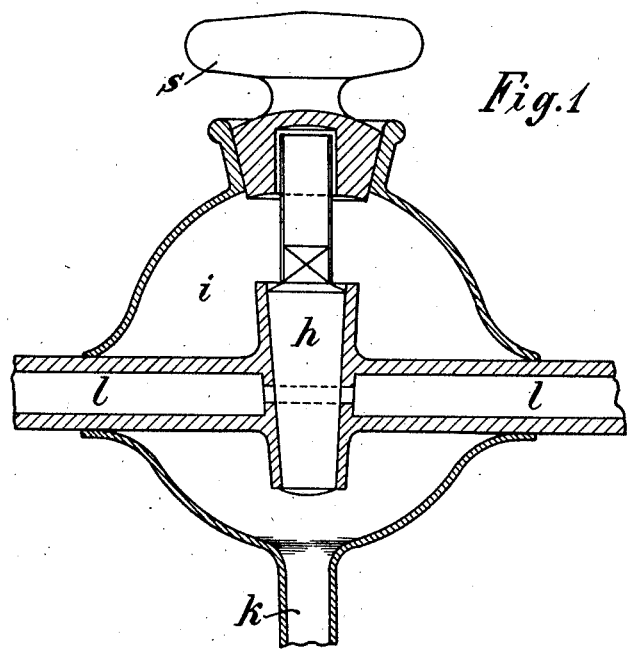
Figure 2:
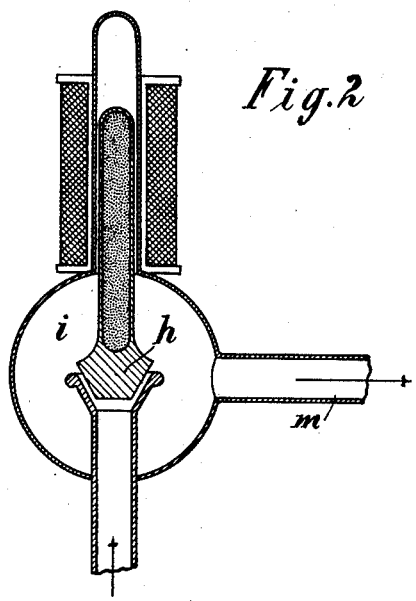

In the accompanying drawing Figure 1 shows one form of embodying the present invention in vertical longitudinal section and Fig. 2 is a similar section of a modified form of the device.

In Fig. 1 the receptacle to be exhausted is connected by the conduit $l$ having stop cock $h$ to the high vacuum pump, while the chamber $i$, in which the entire stop cock $h$ is inclosed, is connected by a pipe $k$ to the vacuum pump of lower capacity. Thus the vacuum in the chamber $i$ will be equal to that produced by the lower capacity pump, which in the manufacture of incandescent lamps does not generally exceed 5 mm. mercury column, and the difference in the degree of vacuum in the two pipe systems $l$ and $k$ will only amount to a few millimeters mercury column, so that the stop cock $h$ will easily be kept tight. The chamber $i$ may be closed by a stopper $s$ ground into its opening and as illustrated in the drawing the stem of the plug of the cock may extend into an opening of similar cross section in the lower face of the stopper so that the rotation of the latter will open or close the cock.

It is self evident that a valve or other closing device might be substituted for the cock $h$, as also that a stuffing box and gland might take that place of the stopper $s$, and through which the stem of the plug could be taken.

In the modification illustrated in Fig. 2, the chamber $i'$ is entirely closed and the interior closing device $h'$ (plug-valve) which closes on to a seat at the top of one of the high vacuum conduits $l'$ is operated magnetically from the exterior, the valve $h'$ being raised or the plug $h$ turned by the aid of an electromagnet $o$. This modification is particularly adapted for works or plants, where only one vacuum pump is available and is connected up to the pipe $m$.

I claim as my invention:—

1. In a device for closing a vacuum conduit, the combination, with the conduit, of a valve therein, a vacuum chamber entirely surrounding and inclosing the valve, and means for at will closing or opening said valve.

2. In a device for closing a vacuum conduit, the combination, with the conduit, of a valve therein, a vacuum chamber entirely surrounding and inclosing the valve, and means for at will closing or opening said valve and operated from the exterior of the chamber.

3. In a device for closing a vacuum conduit, the combination, with the conduit, of a valve in said conduit, a vacuum chamber entirely inclosing said valve, and means entirely independent of the fluid in the conduit, for at will closing or opening said valve and adapted to be operated from the outside of the conduit.

4. In a device for closing a vacuum conduit, the combination, with the conduit, of a seat provided in said conduit, a valve in said seat and provided with a stem, a vacuum chamber entirely surrounding said valve and stem, and means for exerting a force on and moving said stem and operatable from the outside of the chamber.

5. In a device for closing a vacuum conduit, the combination, with the conduit, of a valve seat provided in said conduit, a rotatable plug in said seat and provided with a stem, a vacuum chamber surrounding said valve and stem and provided with an opening, and a stopper in said opening and provided with a recess engaging said stem, and adapted to rotate the stem and plug.

In testimony whereof I affix my signature in the presence of two witnesses.

OTTO SCHALLER.

Witnesses:
HENRY HASPER,
WOLDEMAR HAUPT.

Copies of this patent may be obtained for five cents each, by addressing the "Commissioner of Patents, Washington, D. C."